US011198253B2

(12) United States Patent
Nation et al.

(10) Patent No.: US 11,198,253 B2
(45) Date of Patent: Dec. 14, 2021

(54) FORMING FEATURES IN ADDITIVELY MANUFACTURED COMPOSITE MATERIALS USING SACRIFICIAL SUPPORT MATERIALS

(71) Applicant: Rolls-Royce Corporation, Indianapolis, IN (US)

(72) Inventors: Cory Nation, Indianapolis, IN (US); Matthew T. Kush, Martinsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 147 days.

(21) Appl. No.: 16/555,820

(22) Filed: Aug. 29, 2019

(65) Prior Publication Data
US 2021/0060866 A1   Mar. 4, 2021

(51) Int. Cl.
*B29C 64/40* (2017.01)
*B29C 64/118* (2017.01)
*B29C 64/245* (2017.01)
*B33Y 10/00* (2015.01)
*B33Y 80/00* (2015.01)

(52) U.S. Cl.
CPC ............ *B29C 64/40* (2017.08); *B29C 64/118* (2017.08); *B29C 64/245* (2017.08); *B33Y 10/00* (2014.12); *B33Y 80/00* (2014.12)

(58) Field of Classification Search
CPC ..... B29C 64/40; B29C 64/118; B29C 64/245; B33Y 10/00; B33Y 80/00; B28B 1/001
See application file for complete search history.

(56) References Cited

U.S. PATENT DOCUMENTS

| 6,375,880 | B1 | 4/2002 | Cooper et al. | |
| 9,797,263 | B2 | 10/2017 | Varney et al. | |
| 2017/0297098 | A1 | 10/2017 | Myerberg et al. | |
| 2019/0009472 | A1* | 1/2019 | Mark | B29C 70/384 |
| 2019/0134971 | A1* | 5/2019 | Nielsen-Cole | B29C 48/304 |
| 2019/0299522 | A1* | 10/2019 | Chapiro | B29C 70/38 |
| 2020/0016823 | A1* | 1/2020 | Hymas | B29C 64/314 |
| 2020/0047402 | A1* | 2/2020 | De Backer | B33Y 40/00 |

FOREIGN PATENT DOCUMENTS

EP          3218160 A1      9/2017

OTHER PUBLICATIONS

Kietzman et al., "Layered Manufacturing Material Issues for SDM of Polymers and Ceramics," International Solid Freeform Fabrication Symposium, Jan. 1997, 9 pp.

* cited by examiner

*Primary Examiner* — Joseph S Del Sole
*Assistant Examiner* — Jamel M Nelson
(74) *Attorney, Agent, or Firm* — Shumaker & Sieffert, P.A.

(57) ABSTRACT

A method may include depositing a sacrificial support material on or adjacent to a build surface. The sacrificial support material may be configured to support a continuous reinforcement material during an additive manufacturing technique. The method also may include extruding the continuous reinforcement material from an additive manufacturing device such that at least a portion of the continuous reinforcement material contacts and is supported by the sacrificial support material; and removing the sacrificial support material to result in a feature defined at least in part by the continuous reinforcement material at the absence of sacrificial support material.

19 Claims, 6 Drawing Sheets

FORMING FEATURES IN ADDITIVELY MANUFACTURED COMPOSITE MATERIALS USING SACRIFICIAL SUPPORT MATERIALS

TECHNICAL FIELD

The disclosure relates generally to the use of additive manufacturing techniques.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling, in which heated material, such as polymer, is extruded from a nozzle and cools to be added to the structure, or stereolithography, in which an energy source is used to selectively cure a liquid photopolymer resin to a desired shape of the component.

SUMMARY

In some examples, the disclosure describes a method that includes depositing a sacrificial support material on or adjacent to a build surface, wherein the sacrificial support material is configured to support a continuous reinforcement material during an additive manufacturing technique; extruding the continuous reinforcement material from an additive manufacturing device such that at least a portion of the continuous reinforcement material contacts and is supported by the sacrificial support material; and removing the sacrificial support material to result in a feature defined at least in part by the continuous reinforcement material at the absence of sacrificial support material.

In some examples, the disclosure describes an article that includes a composite body comprising a continuous reinforcement material; and a sacrificial support material, wherein at least a portion of the continuous reinforcement material contacts and is supported by the sacrificial support material, and wherein the sacrificial support material is configured to be removed from the article to result in a feature defined by the continuous reinforcement material at the absence of sacrificial support material.

In some examples, the disclosure describes a method that includes depositing a sacrificial support on or adjacent to a build surface, wherein the sacrificial support is configured to support a reinforcement material of a ceramic matrix composite during an additive manufacturing technique, and wherein the sacrificial support comprises a core and a coating on the core; depositing the reinforcement material using additive manufacturing such that at least part of the reinforcement material contacts the coating of the sacrificial support; and removing the core of the sacrificial material to result in a feature defined at least in part by the coating, wherein the coating remains and is coupled to the reinforcement material after the removal of the core.

The details of one or more examples are set forth in the accompanying drawings and the description below. Other features, objects, and advantages will be apparent from the description and drawings, and from the claims.

DETAILED DESCRIPTION

The disclosure generally describes techniques for forming an additively manufactured ceramic matrix composite (CMC) component using sacrificial support material to define features in the additively manufactured CMC component. In some examples, the techniques may be used to form features otherwise not possible using conventional additive manufacturing techniques, e.g., due to collapse of unsupported features during the manufacturing process. The sacrificial support material supports a reinforcement material of the CMC during additive manufacturing. The additive manufacturing technique may include, in some examples, extrusion of the reinforcement material. For instance, the reinforcement material may include a continuous fiber. Once the reinforcement material has been additively deposited to define a preform and the preform has been at least partially rigidized, the sacrificial support material may be removed to define the feature in the additively manufactured CMC component.

In this way, the technique may enable production of additively manufactured components with features such as unsupported overhangs, grooves, or the like, or features with relatively fine sizes. Such features may be difficult or impossible to form using conventional additive manufacturing techniques, as the additively manufactured material may lack sufficient strength or formability to maintain the desired shape without support before rigidizing (e.g., cooling, curing, or the like). Additionally, or alternatively, the techniques described herein may reduce machining time on the additively manufactured CMC after additive manufacturing, may enable greater control of feature location compared to techniques that form features by removing material, and/or may reduce effects of features of on life of a component, e.g., due to formation of the features damaging reinforcement material or exposing reinforcement material to the environment, which it may be chemically attacked by environmental chemical species.

In some examples, the sacrificial support material also may be used to form a coating on a surface of a feature during formation of the feature. For example, the sacrificial support material may include a core and a coating on the core. After the feature has been defined during the additive manufacturing technique, the core of the sacrificial support material may be removed while the coating material remains in contact with the additively manufactured reinforcement material and/or the CMC. In this way, the sacrificial support material may be used to coat surfaces of features of the additively manufactured CMC component while defining the features in the additively manufactured CMC component. In some examples, this may facilitate coating surfaces that are otherwise difficult to access with other coating techniques such as slurry deposition or vapor phase coating techniques.

Figure 1:
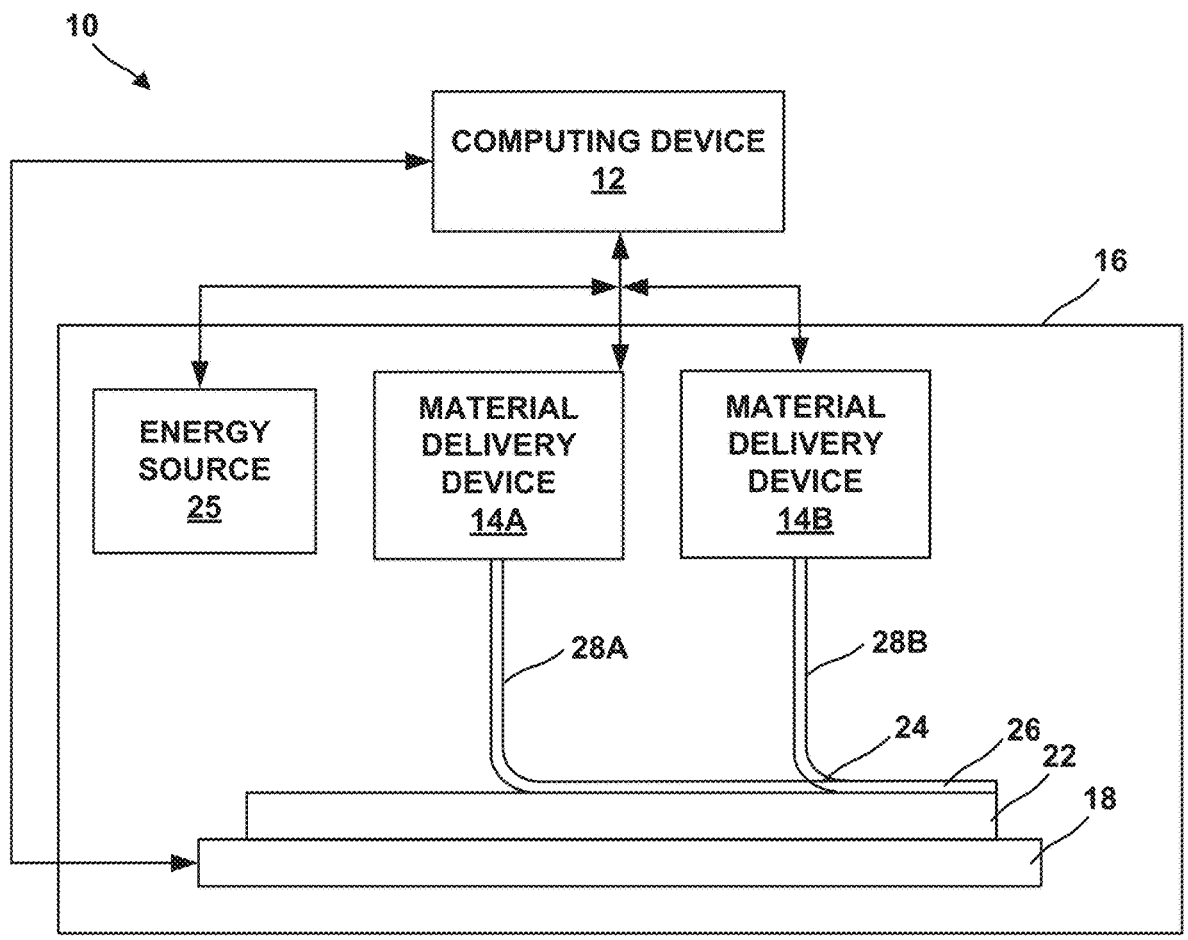
FIG. 1 is a conceptual block diagram illustrating an example additive manufacturing system for forming a CMC additively manufactured component using a sacrificial support material to define features of the additively manufactured CMC component.

FIG. 1 is a conceptual block diagram illustrating an example additive manufacturing system 10 for forming a ceramic matrix composite (CMC) additively manufactured component using a sacrificial support material to define features of the additively manufactured CMC component. In the example illustrated in FIG. 1, additive manufacturing system 10 includes a computing device 12, a first material delivery device 14A, a second material delivery device 14B, an enclosure 16, a stage 18, a substrate 22, and an energy source 25. First and second material delivery devices 14A and 14B are collectively referred to as material delivery devices 14.

Computing device 12 may include, for example, a desktop computer, a laptop computer, a workstation, a server, a mainframe, a cloud computing system, or the like. Computing device 12 is configured to control operation of additive manufacturing system 10, including, for example, material delivery devices 14, stage 18, or both. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Computing device 12 may be communicatively coupled to material delivery devices 14, stage 18, and/or energy source 25 using respective communication connections. In some examples, the communication connections may include network links, such as Ethernet, ATM, or other network connections. Such connections may be wireless and/or wired connections. In other examples, the communication connections may include other types of device connections, such as USB, IEE 1394, or the like.

Substrate 22 may include a build plate on stage 18, or any suitable substrate defining a build surface. In some examples, system 10 may not include a separate substrate 22, and reinforcement material 28A and sacrificial support material 28B may be deposited on a build surface defined by stage 18, or on another component, or on layers of prior-deposited materials 28. Stage 18 may be configured to selectively position and restrain substrate 22 in place relative to stage 18 during manufacturing of the additively manufactured component.

In some examples, additive manufacturing system 10 includes enclosure 16, which at least partially encloses material delivery devices 14, stage 18, substrate 22, and/or energy source 25. Enclosure 16 may provide physical protection to material delivery devices 14, stage 18, substrate 22, and/or energy source 25 during operation of additive manufacturing system 10, may maintain an atmosphere within enclosure 16 in a desired state (e.g., filled with an inert gas, under vacuum, or maintained at a desired temperature), or the like. In some examples, enclosure 16 may include a furnace or another thermal chamber or environment in which any predetermined temperature sufficient to thermally sacrifice the sacrificial support material may be maintained. In some examples, enclosure 16 may include thermally insulative walls, and energy source 25 within enclosure 16 may provide a source of heat to cause an interior of enclosure 16 to be heated. In some examples, one or more heating elements or coils may be disposed in or on walls of enclosure 16 to cause an interior of enclosure 16 to be heated.

In some examples, stage 18 is movable relative to material delivery devices 14 and/or energy source and/or material delivery devices 14 and/or energy source 25 are movable relative to stage 18. For example, stage 18 may be translatable and/or rotatable along at least one axis to position substrate 22 relative to material delivery devices 14 and/or energy source 25. Similarly, material delivery devices 14 and/or energy source 25 may be translatable and/or rotatable along at least one axis to position material delivery devices 14 and/or energy source 25 relative to substrate 22. For example, one or more of stage 18, material delivery devices 14, and energy source 25 may be movable under control of computing device 12 to position stage 18, substrate 22, or both, relative to material delivery devices 14 and/or energy source 25. For example, computing device 12 may control movement of stage 18, material delivery devices 14, and/or energy source 25 in one or more axes (e.g., three orthogonal axes along which the component can translate, five axes along which the component can translate and rotate, six axes along which the component can translate and rotate, or the like).

FIG. 1 illustrates two material delivery devices 14A and 14B. In general, system 10 may include at least one material delivery device. For example, system 10 may include a single material delivery device that is configured to deliver reinforcement material for a CMC in an additive manufacturing technique. In other examples, a single material delivery device may include a plurality of reels or reservoirs holding respective materials and a corresponding number of nozzles for extruding the materials. In examples in which system 10 includes two material delivery devices 14A and 14B, first material delivery device 14A may be configured to deliver reinforcement material for a CMC and second material delivery device 14B may be configured to deliver sacrificial support material.

Regardless of the number of material delivery devices 14, each device of material delivery devices 14 may include one or more material sources. The material sources may include a reel that holds wound material, a reservoir that holds a volume of material, or the like. Computing device 12 may control material delivery devices 14 to advance the respective material from the reel. The material 28A or 28B (collectively, "materials 28") is then extruded and laid down in a road 26 on major surface 24 of substrate 22 (or in subsequent layers, on a previously deposited road 26). Optionally, material delivery devices 14 may heat the material to above a softening or melting point of the material. If heated, the softened or melted material 28 cools and, in this way, is joined to other roads.

Similarly, in examples in which the material delivery devices 14 include a reservoir that holds a volume of material, computing device 12 may control material delivery devices 14 to cause the material to flow, extrude, or draw from the reservoir and out of a respective nozzle or die of material delivery devices 14, in the form of materials 28 that may be deposited on or adjacent stage 18 or substrate 22. Materials 28 may be dried, cured, or otherwise solidified to ultimately form an additively manufactured component. In some examples, system 10 may include an energy delivery device 25 configured to deliver energy to materials 28 and/or an article formed by materials 28, e.g., to cure materials 28.

Regardless of whether material delivery devices 14 hold a reel of material or a volume of a material, material delivery devices 14 are configured to provide a respective material. For example, first material delivery device 14A may be configured to output a first material, and the first material may include a reinforcement material for the CMC. The reinforcement material may include, for example, aluminum oxide ($Al_2O_3$), mullite ($Al_6Si_2O_{13}$), zirconium oxide ($ZrO_2$), carbon (C), silicon carbide (SiC), silicon nitride ($Si_3N_4$), boron nitride, an aluminosilicate, silica ($SiO_2$), a transition metal carbide or silicide (e.g. WC, $Mo_2C$, TiC, $MoSi_2$, $NbSi_2$, $TiSi_2$), or the like. Suitable commercially available inorganic fibers include, for example, pre-ceramic SiC fibers such as those available under the trade designation HI-NICALON and SYLRAMIC from COI Ceramics, Inc., San Diego, Calif.

In some examples, the reinforcement material may include a continuous reinforcement material. The continuous reinforcement material may include a continuous monofilament or multifilament two-dimensional or three-dimensional weave or braid that includes one or more filaments of the reinforcement material described above. Such a two-dimensional or three-dimensional weave or braid may be referred to as a tow.

In some examples, a tow or reinforcement material 28A that includes reinforcement material may be coated with an interface coating. The interface coating may function a compliant layer at an interface between the filaments or fibers and/or the tow and a later-formed matrix to enhance toughness and crack deflection in the final composite article and/or to prevent reaction of the filaments or fibers with subsequently introduced components. Suitable coatings include, but are not limited to, carbon, aluminum nitride, boron nitride, silicon nitride, silicon carbide, boron carbide, metal borides, transition metal silicides, transition metal oxides, transition metal silicates, rare earth metal silicates and mixtures and combinations thereof. In some examples, the interface coating may not extend into an interior of the tow and may be present substantially at a major surface of the tow. In other examples, the interface coating may at least partially extend into an interior of the tow among the filaments or fibers, e.g., may coat individual filaments or fibers.

In some examples, a tow or reinforcement material 28A that includes reinforcement material may be coated or impregnated with curable resin, instead of or in addition to being coated with interface coating. The curable resin may include a matrix precursor. In some examples, the curable resin may surround a tow or reinforcement material 28A as a coating. The curable resin may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The curable resin may also include a precursor, for example, one or more monomers, oligomers, or non-crosslinked polymers suitable for forming a polymeric material upon curing.

In some examples, the curable resin may include a flowable carrier. The flowable carrier may impart flowability to the composition. The flowable carrier may be removed from the tow or reinforcement material 28A, for example, by drying, evaporation, or the like. The flowable carrier may include an organic or inorganic solvent or mixture of solvents. In some examples, instead of, or in addition to, one or more solvents, the flowable carrier may include one or more of a gel, a resin, a monomer, an oligomer, a polymer, or a lubricant. In some examples, one or more of the resin, monomer, oligomer, or polymer may be substantially the same as the curable resin. In other examples, one or more of the resin, monomer, oligomer, or polymer may be different from curable resin.

In some examples, the curable resin may be a high-char yield resin, a preceramic polymer resin, or mixtures thereof. The high char-yielding component may include a material, such as a monomer, an oligomer, a polymer, or the like, that, when pyrolyzed, yields a high percentage of carbon. In some examples, the high char-yielding component includes furfuryl alcohol, a short-chain polymer derived by polymerizing furfuryl alcohol, or a phenolic material, such as a phenolic resin carried by an organic solvent.

The preceramic polymer resin may include inorganic or hybrid organic-inorganic polymers that may be thermally treated to form ceramic material. In some examples, the preceramic polymer resin includes polymers with one or more of silicon, boron, or aluminum in the polymeric backbone. For example, polymers such as polysiloxanes, polysilazanes, and polycarbosilanes, polyborosilane, polyborosilazane, borazine, or combinations thereof may be used.

In some examples, the curable resin additionally includes metal, alloy, or ceramic particles. For example, the curable resin may include particles including silicon metal (elemental silicon), aluminum nitride, aluminum diboride, boron carbide, aluminum oxide, mullite, zirconium oxide, carbon, silicon carbide, silicon nitride, transition metal nitrides, transition metal borides, rare earth oxides, and mixtures and combinations thereof. The size of the particles may vary widely, and typically have a major dimension of less than about 50 µm. In various embodiments, the particles may have a wide variety of regular or irregular shapes including, for example, spheres, rods, disks, and the like. In various embodiments, the major dimensions of the particles may form a monomodal, a bimodal, or a multimodal distribution. In some examples, the curable resin may include or be in the form of a slurry, or a slurry may include curable resin. In some such examples, materials 28 may be impregnated with the slurry.

In some examples, the curable resin may include a polymerization initiator, for example, a thermal initiator or photoinitiator to promote thermal curing or photocuring. The curable resin may optionally include other additives such as dispersants, binders, surfactants, pH adjustors, and the like. The curable resin may be tacky, sticky, or otherwise cause adjacent reinforcement material 28A to adhere to each other.

In some examples, system 10 includes a slurry bath to provide curable resin to reinforcement material 28A prior to being deposited from material delivery device 14A. For example, a slurry bath may hold a volume of slurry or another composition including curable resin, and material delivery devices 14 or another component of system 10 may cause reinforcement material 28A to be drawn or advanced from a reel into and through the slurry bath, where reinforcement material 28A may be coated or impregnated with curable resin. Reinforcement material 28A may be coated or impregnated by any suitable techniques, such as spraying, coating, drawing, dripping, and the like or combinations thereof, in a slurry bath.

Thus, in some examples, reinforcement material 28A includes a reinforcement material and a matrix material precursor. In other examples, reinforcement material 28A may include only a reinforcement material, and the matrix material precursor or matrix material may be introduced after fully laying up the reinforcement material using material delivery device 14A.

In some examples, rather than including a continuous reinforcement material, the reinforcement material may include non-continuous reinforcement material within a carrier material, where the combination of the non-continuous reinforcement material and the carrier material makes a reinforcement material 28A. The non-continuous reinforcement material may include any of the reinforcement material compositions described herein, and the non-continuous reinforcement material may be in the form of discontinuous whiskers, platelets, fibers, or particulates.

The carrier material may include a binder. The binders may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The non-continuous reinforcement material may be dispersed in the binder, for example substantially uniformly dispersed in the sacrificial binder.

In some examples, the sacrificial binder(s) may be in the form of a curable polymer precursor. The curable polymer precursor may be curable (for example, thermally curable or photocurable) to form the binder. For example, the curable polymer precursor may be cured as reinforcement material 28A is extruded and/or after reinforcement material 28A is laid down in roads 26. The curable polymer precursor may include a precursor, for example, one or more monomers, oligomers, or non-crosslinked polymers suitable for forming the polymeric material of the sacrificial binder upon curing. Thus, in some examples, energy source 25 may direct energy at a curable polymer precursor, for example, in the material, to selectively cure the curable polymer precursor. In other examples, the heat to which the composition when extruded from material delivery device 14A may initiate the curing reaction, and no additional energy source is used.

Second material delivery device 14B may be configured to deposit sacrificial support material 28B at selected locations of substrate 22 or selected locations over substrate 22. The sacrificial support material 28B may be any material that is configured to physically support reinforcement material 28A during additive manufacturing of the reinforcement material 28A into a preliminary form and later removed using one or more of heating, dissolving, or mechanically removing sacrificial support material 28B. In some examples, sacrificial support material 28B may include a wax, a polymer, or other material that may be melted or burned to remove sacrificial support material 28B. In other examples, sacrificial support material 28B may include a ceramic, such as hexagonal boron nitride, which may be removed by dissolving in water. The sacrificial support material 28B may be selected to ensure that the process used to remove sacrificial support material 28B does not detrimentally affect reinforcement material 28A and any matrix or matrix precursor that is present when sacrificial support material 28B is removed.

Second material delivery device 14B may be configured to deposit sacrificial support material 28B like reinforcement material 28A, e.g., by extrusion from a reel, a reservoir, or the like.

In some examples, rather than second material delivery device 14B being configured to additively manufacture sacrificial support material 28B, sacrificial support material 28B may be pre-formed into desired geometric shapes to define features in the reinforcement material 28A and the pre-formed geometric shape may be physically inserted or positioned at desired locations (e.g., pick and place). In either case, computing device 12 may control second material delivery device 14B or a pick-and-place robot to deposit or place sacrificial support material 28B at desired locations to define features. The desired locations may be based on a CAM/CAD file of the part being formed from reinforcement material 28A. In some examples, positioning or depositing of sacrificial material may be conducted prior to deposition of reinforcement material 28A, concurrently with deposition of reinforcement material 28A, or interleaved with deposition of reinforcement material 28A. The roads 26 of reinforcement material 28A may be laid in contact with or supported by the sacrificial support material 28B. In some examples, sacrificial support material 28B may be cured prior to the depositing of the roads 26 of reinforcement material 28A that contact sacrificial support material 28B.

Once sacrificial support material 28B and reinforcement material 28A have been additively manufactured such that sacrificial support material 28B defines features in reinforcement material 28A, sacrificial support material 28B may be removed to leave the features of the additively manufactured component at location of the removed sacrificial support material 28B. In some examples sacrificial support material 28B may be removed after the additively manufactured preform has been at least partially rigidized, e.g., by curing or reacting the matrix precursor, by coating reinforcement material 28A using chemical vapor infiltration/chemical vapor deposition, by impregnating reinforcement material 28A with a matrix material or matrix precursor, or the like.

In this way, system 10 may be used to produce additively manufactured CMC components with features such as unsupported overhangs, grooves, or the like, or features with relatively fine sizes. Such features may be difficult or impossible to form using conventional additive manufacturing techniques, as the additively manufactured material may lack sufficient strength or formability to maintain the desired shape without support before rigidizing (e.g., cooling, curing, or the like). Additionally, or alternatively, the techniques described herein may reduce machining time on the additively manufactured CMC after additive manufacturing, may enable greater control of feature location compared to techniques that form features by removing material, and/or may reduce effects of features of on life of a component, e.g., due to formation of the features damaging reinforcement material or exposing reinforcement material to the environment, which it may be chemically attacked by environmental chemical species.

Figure 2:
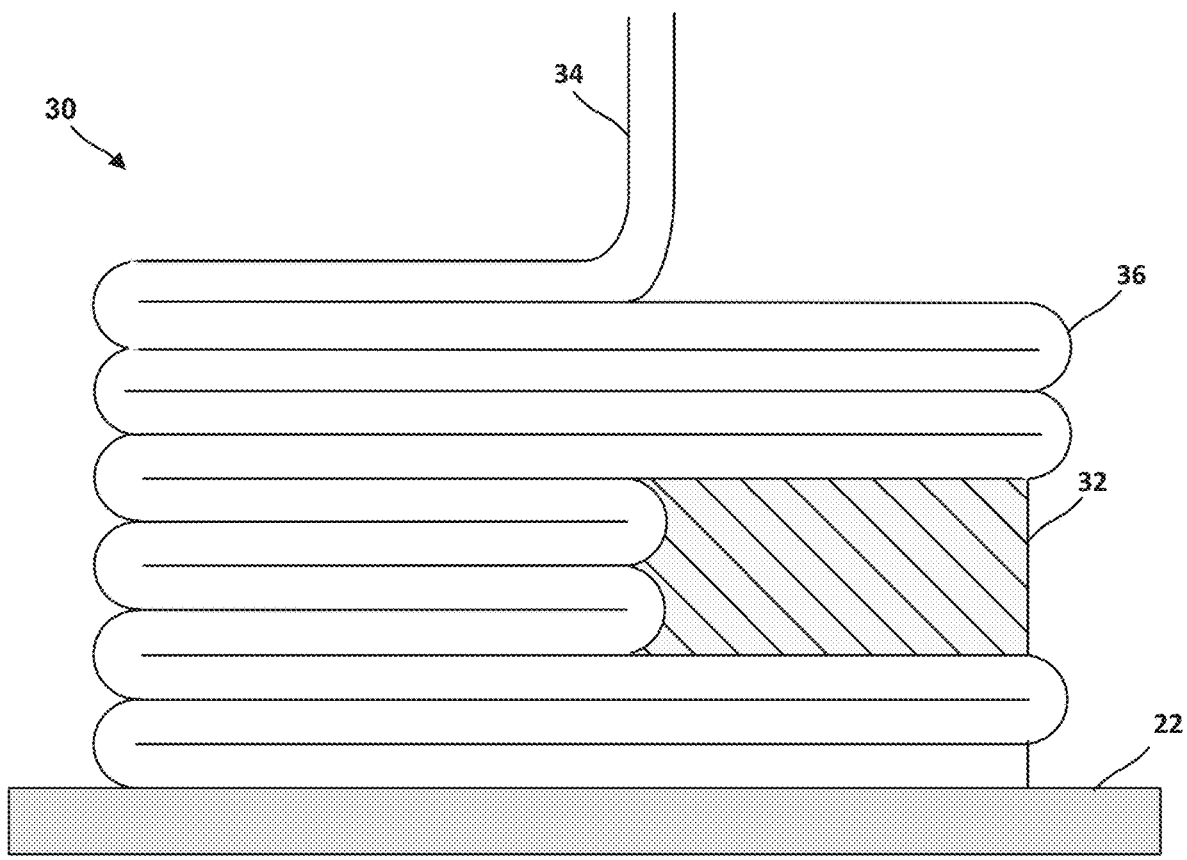
FIG. 2 is a conceptual diagram illustrating example additively manufactured component and a sacrificial support material.
Figure 3A:
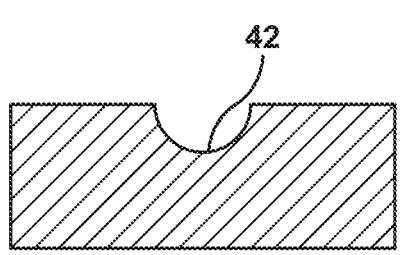
FIGS. 3A-3H are cross-sectional diagrams illustrating examples of 3D features formed in an additively manufactured component.
Figure 3B:
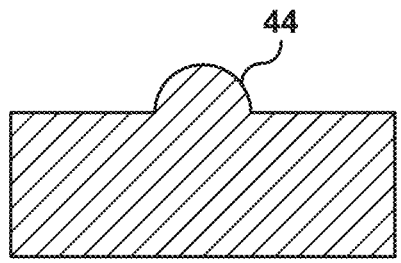
Figure 3C:
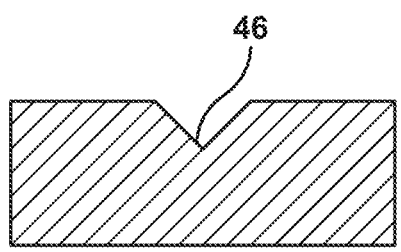
Figure 3D:
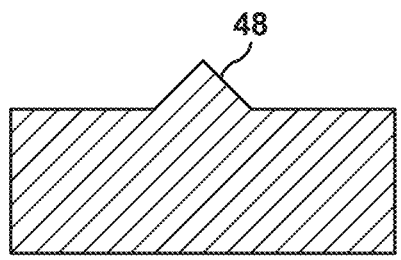
Figure 3E:
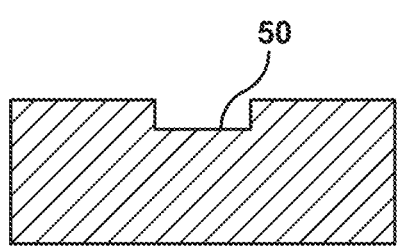
Figure 3F:
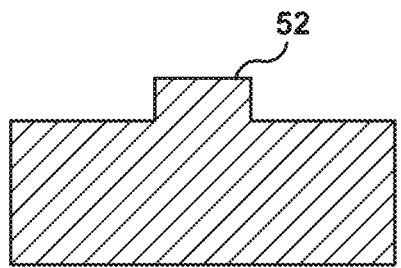
Figure 3G:
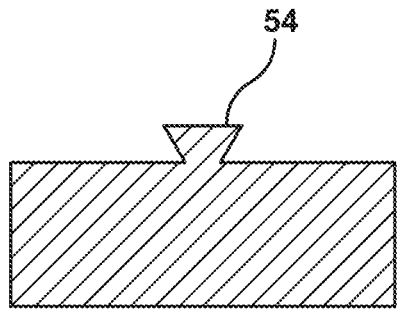
Figure 3H:
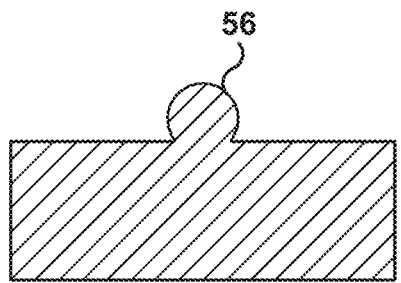

In some examples, the features formed in the additively manufactured CMC component may have a size that depends on a minimum radius of curvature of the reinforcement material and a size and shape of the sacrificial support material. For example, FIG. 2 is a conceptual diagram illustrating example additively manufactured component 30 and a sacrificial support material 32. Additively manufactured component 30 is formed from a reinforcement material 34, which may be similar to or the same as any of the reinforcement materials described above with reference to reinforcement material 28A. Similarly, sacrificial support material 32 may be similar to or the same as any of the reinforcement materials described above with reference to sacrificial support material 28B and may be additively manufactured or pick-and-placed. As shown in FIG. 2, reinforcement material 34 includes a continuous reinforcement material may include a continuous monofilament or multifilament two-dimensional or three-dimensional weave or braid that includes one or more filaments of the reinforcement material described above.

The additive manufacturing system deposits reinforcement material 34 in a continuous road 36 connected by turns or curves in reinforcement material 34. Based on mechanical properties of reinforcement material 34, reinforcement material 34 may have a minimum radius of curvature at which reinforcement material 34 can bend before breaking. As such, the minimum radius of curvature of reinforcement material 34 may define a minimum size of a feature that may be formed using reinforcement material 34 and sacrificial support material 32.

Sacrificial support material and reinforcement material may be used to define features having a variety of shapes. FIGS. 3A-3H are cross-sectional diagrams illustrating examples of features formed in an additively manufactured component using sacrificial support material and reinforcement material. Features include hemispherical depressions 42 and projections 44, triangular depressions 46 and projections 48, rectangular depression 50 and projections 52, overhands 54 and 56, or complex combinations of these and other shapes.

Figure 4:
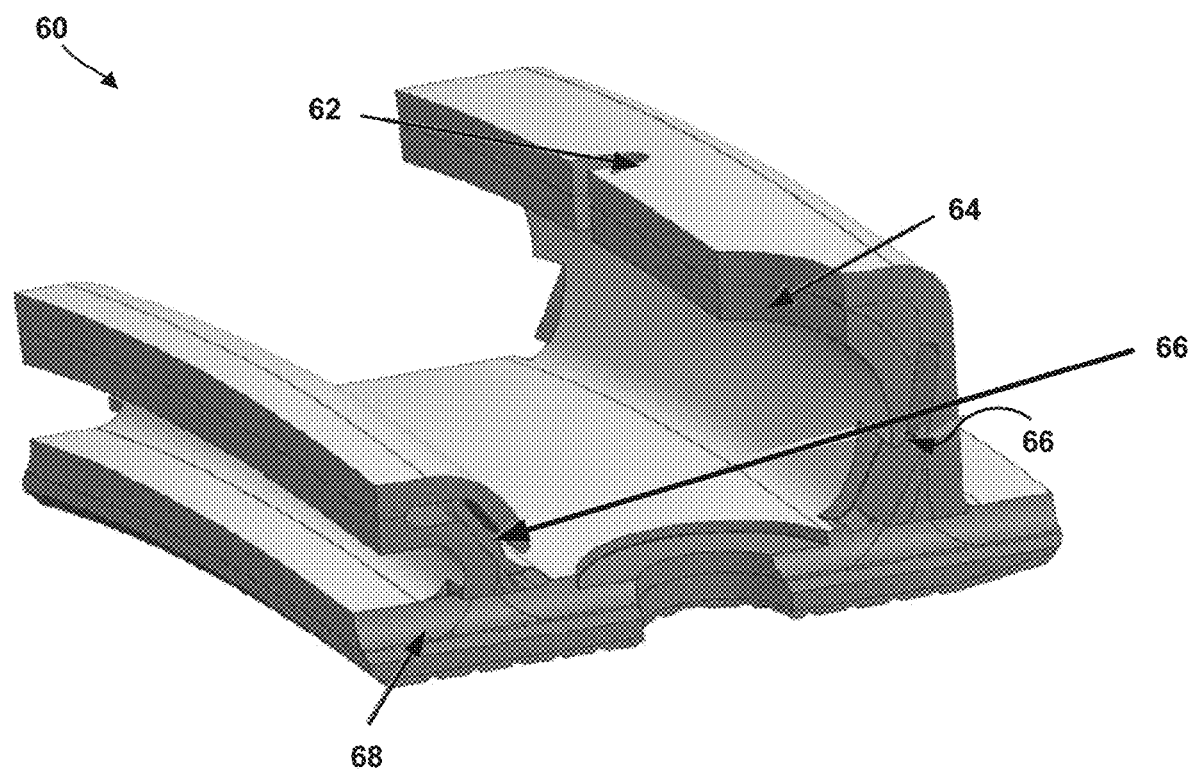
FIG. 4 is a cross-sectional diagram illustrating an additively manufactured component including a plurality of features defined by the additively manufactured component after removal of a sacrificial support material(s).

FIG. 4 is a cross-sectional diagram illustrating an additively manufactured component including other example features defined by the additively manufactured component after removal of a sacrificial support material(s). Features shown in FIG. 4 include a notch 62, such as an anti-rotation notch; a cutout 64, such as a probe cutout; a groove 66, such as a strip seal groove; and a chamfer 68, such as a rod seal chamfer. The additive manufacturing techniques using sacrificial support materials may be used to form these and other features in CMCs.

Figure 5:
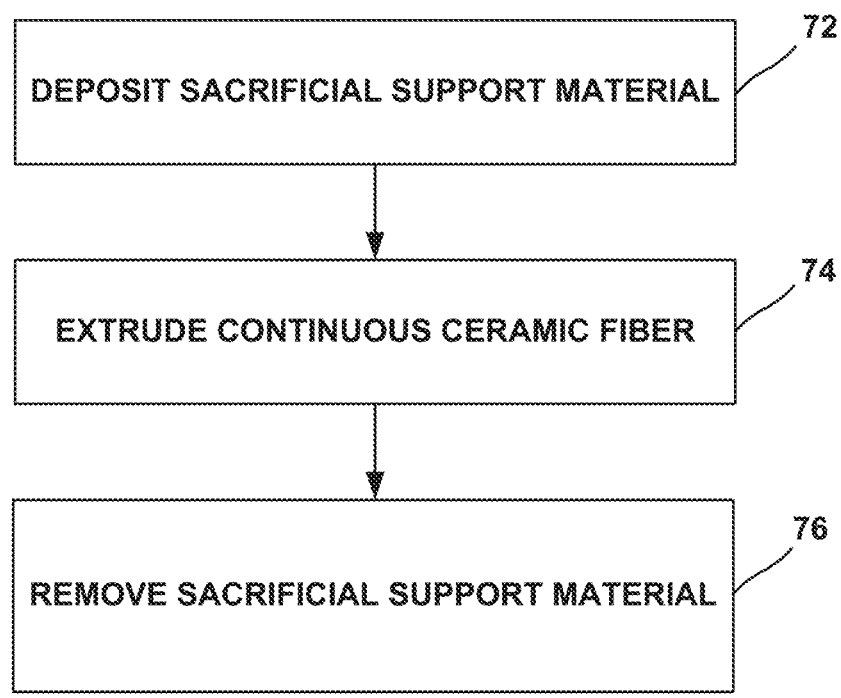
FIG. 5 is a flow diagram illustrating an example technique for forming an additively manufactured component using a sacrificial support material.

FIG. 5 is a flow diagram illustrating an example technique for forming an additively manufactured component using a sacrificial support material. The technique of FIG. 5 will be described with reference to system 10 of FIG. 1, although the technique may be performed using another system.

The technique of FIG. 5 includes depositing a sacrificial support material 28B on or adjacent to a build surface (e.g., substrate 22) (72). Sacrificial support material 28B is configured to support at least a portion of a continuous reinforcement material 28A during an additive manufacturing technique. As described above, the sacrificial support material 28B may be deposited using an additive manufacturing technique, as shown in FIG. 1, or may be deposited using a pick-and-place technique for predefined shapes of sacrificial support material 28B. System 10 may deposit sacrificial support material 28B based on build data for the final CMC component, e.g., the build data indicating locations at which reinforcement material 28A needs or would benefit from mechanical support during the build process.

The technique of FIG. 5 also includes extruding reinforcement material 28A from an additive manufacturing device (e.g., material delivery device 14A) such that at least a portion of reinforcement material 28A contacts and is supported by sacrificial support material 28B (74). Although steps 72 and 74 are shown sequentially, steps 72 may be performed concurrently or in an interleaved manner, in which some sacrificial support material 28B is deposited (72), some reinforcement material 28A is extruded (74), additional sacrificial support material 28B is deposited (72), additional reinforcement material 28A is extruded (74), and so on.

As described above, in some examples, reinforcement material 28A includes a continuous reinforcement material. In other examples, reinforcement material 28A includes a discontinuous reinforcement material in a carrier, such as a binder. In either case, computing device 12 may be configured to control material delivery device 14A and/or stage 18 to position material delivery device 14A relative to stage 18 so that reinforcement material 28A is deposited at selected locations relative to stage 18. The deposition may include extrusion of a continuous filament that includes the continuous reinforcement material or the discontinuous reinforcement material. The build path along which computing device 12 controls material delivery device 14A and/or stage 18 to move to position material delivery device 14A relative to stage 18 may be selected to result in desired mechanical properties of the resultant CMC component, e.g., strength in selected directions, planes, or the like, based on the orientation of the reinforcement material.

Additionally, the build path may account for or include positions of sacrificial support material 28B, such that material delivery devices 14 are positioned relative to stage 18 to deposit at least some of reinforcement material 28A contacting and/or being supported by sacrificial support material to define one or more features in the resultant CMC component.

The technique of FIG. 5 also includes removing sacrificial support material 28B to result in a feature defined at least in part by reinforcement material 28A at the absence of sacrificial support material 28B (76). Sacrificial support material 28B may be removed at or after a time at which the component or partial component defined by reinforcement material 28A has sufficient mechanical strength to substantially maintain its shape in the absence of sacrificial support material 28B. For example, in some implementations in which reinforcement material 28A includes a matrix precursor (or curable resin), sacrificial support material 28B may be removed after the curable resin is cured, as the cured curable resin may provide sufficient mechanical properties to enable reinforcement material 28A to substantially maintain its shape in the absence of sacrificial support material 28B. As another example, sacrificial support material 28B may be removed after the component defined by reinforcement material 28A has been exposed to a chemical vapor infiltration/chemical vapor deposition step, a slurry impregnation step, or the like, which introduced matrix material around reinforcement material 28A. The chemical vapor infiltration/chemical vapor deposition step, a slurry impregnation step, or the like may at least partially rigidize reinforcement material 28A.

As another example, sacrificial support material 28B may be removed during further processing of the component defined by reinforcement material 28A. For example, the CMC final component may be formed by forming a matrix of material around reinforcement material 28A. The matrix may be formed at least in part from curable resin on or in reinforcement material 28A, from material introduce after additive manufacturing of reinforcement material 28A, or both. In some examples, the process to form the matrix may include one or more relatively high temperature steps, including, for example, curing the curable resin, melt infiltration with a metal or alloy, such as a silicon-based alloy, or the like. A relatively high temperature step may be performed at a temperature that causes sacrificial support material 28B to melt and/or burn to be removed from the component. In this way, a sacrificial support material 28B may be used during an additive manufacturing technique to support reinforcement material 28A while reinforcement material 28A lacks sufficient rigidity to support itself.

Figure 6:
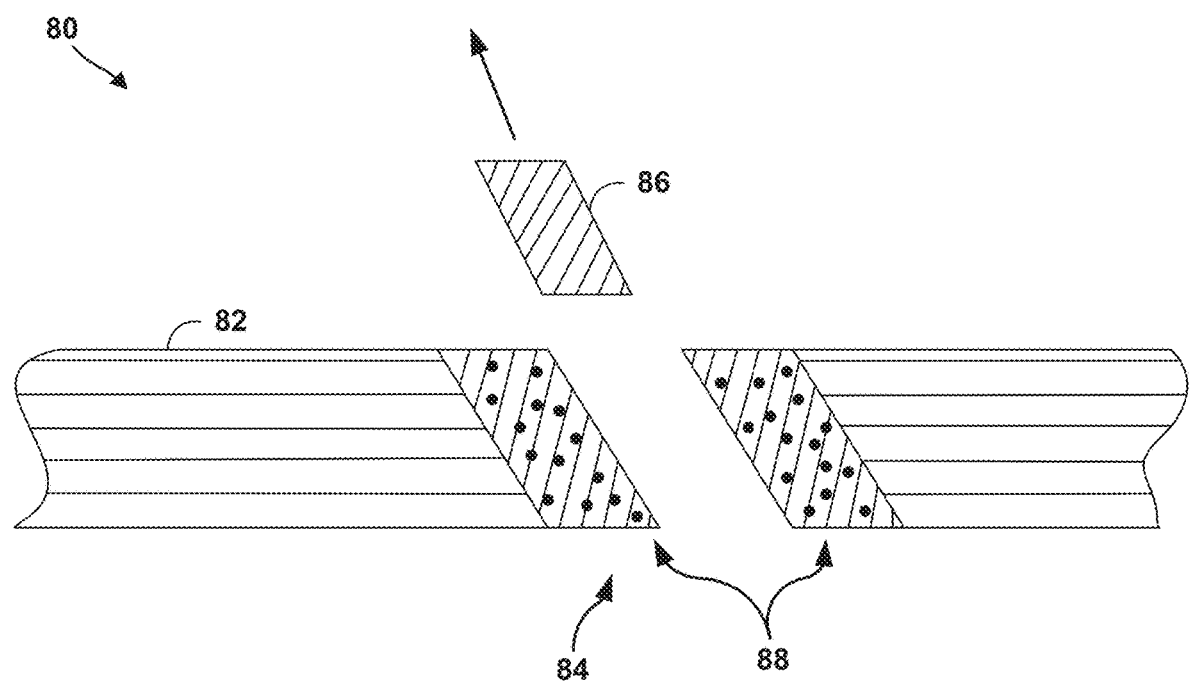
FIG. 6 is a cross-sectional diagram illustrating a system that includes an additively manufactured CMC component and a coated sacrificial support material, in which a core of the coated sacrificial support material is removed to leave a coating attached to additively manufactured CMC component.

In some examples, in addition to providing support for a reinforcement material, a sacrificial support material also may used to deposit a coating on a surface of a CMC component. FIG. 6 is a cross-sectional diagram illustrating a system 80 that includes an additively manufactured CMC component 82 and a coated sacrificial support material 84, in which a core 86 of coated sacrificial support material 84 is removed to leave a coating 88 attached to additively manufactured CMC component 82.

Using coated sacrificial support material 84 to define features in a CMC component may leave surfaces that are relatively inaccessible (e.g., channels, overhangs, holes, apertures, or the like). These surfaces may be vulnerable to attack from environmental species, such as high temperature water vapor, that may damage the CMC. Thus, it may be desirable to coat the surfaces. However, their inaccessibility may make some coating techniques, such as plasma spraying and some vapor phase deposition techniques, unfeasible. Using a coated sacrificial support material 84 to deposit a coating on surfaces of the features may facilitate coating the surfaces and, in some examples, may be the only feasible way of depositing a coating.

Coated sacrificial support material 84 may include a core 86 and a coating 88. Core 86 may include any of the materials described above with respect to sacrificial support material 28B. Core 86 may be formed in any desired shape to define the complementary shape of the feature to be defined in CMC component 82 and may be solid or hollow.

Coating 88 may include any one or more layers that provide desired coating functionality. For example, coating 88 may include a thermal barrier coating (TBC) layer, and environmental barrier coating (EBC) layer, a bond coat layer, or the like. a rare-earth oxide, a rare-earth silicate, an aluminosilicate, or an alkaline earth aluminosilicate.

For example, a TBC layer may include a material and microstructure that provides the layer with relatively low thermal conductivity. For example, a TBC layer may include a porous or columnar microstructure and a zirconia- or hafnia-based coating composition. The zirconia- or hafnia-based coating composition may be modified by inclusion of one or more additives or dopants, such as yttria, calcia, a rare earth oxide, or the like.

As another example, an EBC layer may include mullite, barium strontium aluminosilicate (BSAS), barium aluminosilicate (BAS), strontium aluminosilicate (SAS), at least one rare-earth oxide, at least one rare-earth monosilicate ($RE_2SiO_5$, where RE is a rare-earth element), at least one rare-earth disilicate ($RE_2Si_2O_7$, where RE is a rare-earth element), or combinations thereof. The rare-earth element in the at least one rare-earth oxide, the at least one rare-earth monosilicate, or the at least one rare-earth disilicate may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

In some examples, an EBC layer may include additional and optional constituents, such as alumina, an alkali metal oxide, an alkaline earth metal oxide, $TiO_2$, $Ta_2O_5$, $HfSiO_4$, or the like. The additive may be added to the EBC layer to modify one or more desired properties of the layer. For example, the additive components may increase or decrease the modulus of the layer, may decrease the reaction rate of the EBC layer with calcia-magnesia-alumina-silicate (CMAS; a contaminant that may be present in intake gases of gas turbine engines), may modify the viscosity of the reaction product from the reaction of CMAS and constituent(s) of the EBC layer, may increase adhesion of the layer to an adjacent layer, may increase the chemical stability of the EBC layer, may decrease the steam oxidation rate, or the like.

A bond layer may include a composition selected to increase the adhesion of an EBC layer or TBC layer to CMC component 82. In some examples, the bond layer may include silicon and take the form of a silicon bond layer. In some examples, the bond layer may include mullite (aluminum silicate, $Al_6Si_2O_{13}$), silicon metal or alloy, silica, a silicide, or the like. The bond layer may further include other elements, such as a rare earth silicate including a rare earth silicate.

Coating 88 may include the layers arranged on core 86 such that an outermost layer of coating 88 contacts core 86 and an innermost layer of coating 88 (that contacts CMC component 82) is furthest away from core 86.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Clause 1: A method including depositing a sacrificial support material on or adjacent to a build surface, wherein the sacrificial support material is configured to support a continuous reinforcement material during an additive manufacturing technique; extruding the continuous reinforcement material from an additive manufacturing device such that at least a portion of the continuous reinforcement material contacts and is supported by the sacrificial support material; and removing the sacrificial support material to result in a feature defined at least in part by the continuous reinforcement material at the absence of sacrificial support material.

Clause 2: The method of clause 1, wherein removing the sacrificial support material comprises at least one of dissolving, heating, or mechanically removing the sacrificial support material.

Clause 3: The method of clause 1 or 2, wherein the sacrificial support material comprises at least one of a wax, a ceramic, a nitride, a polymer, a metal, or an alloy.

Clause 4: The method of any one of clauses 1 to 3, further comprising coating the continuous reinforcement material with a matrix material or a matrix material precursor prior to or while extruding the continuous reinforcement material from the additive manufacturing device.

Clause 5: The method of any one of clauses 1 to 3, further comprising introducing a matrix material or a matrix material precursor after extruding the continuous reinforcement material and before removing the sacrificial support material.

Clause 6: The method of any one of clauses 1 to 5, wherein the sacrificial support material comprises a core and a coating on the core, wherein removing the sacrificial support material comprises removing the core and leaving the coating, and wherein the coating is coupled to the reinforcement material after the removal of the core.

Clause 7: The method of any one of clauses 1 to 6, wherein depositing the sacrificial support material comprises additively manufacturing the sacrificial support material.

Clause 8: The method of any one of clauses 1 to 7, wherein a minimum curvature of a surface of the feature comprises a minimum bend radius of the continuous reinforcement material.

Clause 9: The method of any one of clauses 1 to 8, wherein the continuous reinforcement material comprises a continuous monofilament or multifilament two-dimensional or three-dimensional weave or braid.

Clause 10: An article comprising: a composite body comprising a continuous reinforcement material; and a sacrificial support material, wherein at least a portion of the continuous reinforcement material contacts and is supported by the sacrificial support material, and wherein the sacrificial support material is configured to be removed from the article to result in a feature defined by the continuous reinforcement material at the absence of sacrificial support material.

Clause 11: The article of clause 10, wherein the sacrificial support material is configured to be removed by at least one of dissolving the sacrificial support material, heating the sacrificial support material, or mechanically removing the sacrificial support material, and wherein the sacrificial support material comprises at least one of a wax, a ceramic, a nitride, a polymer, or a metal.

Clause 12: The article of clause 10 or 11, wherein the continuous reinforcement material comprises a continuous monofilament or multifilament two-dimensional or three-dimensional weave or braid.

Clause 13: A method comprising: depositing a sacrificial support on or adjacent to a build surface, wherein the sacrificial support is configured to support a reinforcement material of a ceramic matrix composite during an additive manufacturing technique, and wherein the sacrificial support comprises a core and a coating on the core; depositing the reinforcement material using additive manufacturing such that at least part of the reinforcement material contacts the coating of the sacrificial support; and removing the core of the sacrificial material to result in a feature defined at least in part by the coating, wherein the coating remains and is coupled to the reinforcement material after the removal of the core.

Clause 14: The method of clause 13, wherein removing the sacrificial support material comprises at least one of dissolving, heating, or mechanically removing the sacrificial support material.

Clause 15: The method of clause 13 or 14, wherein the core comprises at least one of a wax, a ceramic, a nitride, a polymer, a metal, or an alloy.

Clause 16: The method of any one of clauses 13 to 15, further comprising coating the continuous ceramic fiber with a matrix material or a matrix material precursor prior to or while extruding the continuous ceramic fiber from the additive manufacturing device.

Clause 17: The method of any one of clauses 13 to 16, further comprising introducing a matrix material or a matrix material precursor after extruding the continuous ceramic fiber and before removing the core.

Clause 18: The method of any one of clauses 13 to 17, wherein a minimum curvature of a surface of the feature comprises the minimum bend radius of the continuous ceramic fiber.

Clause 19: The method of any one of clauses 13 to 18, wherein depositing the sacrificial support material comprises additively manufacturing the sacrificial support material.

Clause 20: The method of any one of clauses 13 to 19, wherein the coating comprises a first layer on the core and a second layer on the first layer, and wherein the second layer comprises silicon.

Clause 21: The method of clause 20, wherein the coating comprises at least one of a rare earth silicate, a zirconia-based thermal barrier coating, or a hafnia-based thermal barrier coating.

Various examples have been described. These and other examples are within the scope of the following claims.

What is claimed is:
1. A method comprising:
depositing a sacrificial support material on or adjacent to a build surface, wherein the sacrificial support material is configured to support a continuous reinforcement material during an additive manufacturing technique, and wherein the sacrificial support material comprises a core and a coating on the core;

extruding the continuous reinforcement material from an additive manufacturing device such that at least a portion of the continuous reinforcement material contacts and is supported by the coating of the sacrificial support material; and removing the sacrificial support material to result in a feature defined at least in part by the continuous reinforcement material at the absence of sacrificial support material, wherein removing the sacrificial support material comprises removing the core and leaving the coating, and wherein the coating is coupled to the continuous reinforcement material after the removal of the core.

2. The method of claim 1, wherein removing the sacrificial support material comprises at least one of dissolving, heating, or mechanically removing the sacrificial support material.

3. The method of claim 1, wherein the sacrificial support material comprises at least one of a wax, a ceramic, a nitride, a polymer, a metal, or an alloy.

4. The method of claim 1, further comprising coating the continuous reinforcement material with a matrix material or a matrix material precursor prior to or while extruding the continuous reinforcement material from the additive manufacturing device.

5. The method of claim 1, further comprising introducing a matrix material or a matrix material precursor after extruding the continuous reinforcement material and before removing the sacrificial support material.

6. The method of claim 1, wherein depositing the sacrificial support material comprises additively manufacturing the sacrificial support material.

7. The method of claim 1, wherein a minimum curvature of a surface of the feature comprises a minimum bend radius of the continuous reinforcement material.

8. The method of claim 1, wherein the continuous reinforcement material comprises a continuous monofilament or multifilament two-dimensional or three-dimensional weave or braid.

9. An article comprising:
a composite body comprising a continuous reinforcement material; and
a sacrificial support material, wherein at least a portion of the continuous reinforcement material contacts and is supported by the sacrificial support material, and wherein the sacrificial support material is configured to be removed from the article to result in a feature defined by the continuous reinforcement material at the absence of sacrificial support material.

10. The article of claim 9, wherein the sacrificial support material is configured to be removed by at least one of dissolving the sacrificial support material, heating the sacrificial support material, or mechanically removing the sacrificial support material, and wherein the sacrificial support material comprises at least one of a wax, a ceramic, a nitride, a polymer, or a metal.

11. The article of claim 9, wherein the continuous reinforcement material comprises a continuous monofilament or multifilament two-dimensional or three-dimensional weave or braid.

12. A method comprising:
depositing a sacrificial support on or adjacent to a build surface, wherein the sacrificial support is deposited using an additively manufacturing technique, wherein the sacrificial support is configured to support a reinforcement material of a ceramic matrix composite during an additive manufacturing technique, wherein the sacrificial support comprises a core and a coating on the core;
depositing the reinforcement material using additive manufacturing such that at least part of the reinforcement material contacts the coating of the sacrificial support; and
removing the core of the sacrificial support to result in a feature defined at least in part by the coating, wherein the coating remains and is coupled to the reinforcement material after the removal of the core.

13. The method of claim 12, wherein removing the core of the sacrificial support comprises at least one of dissolving, heating, or mechanically removing the core of the sacrificial support material.

14. The method of claim 12, wherein the core comprises at least one of a wax, a ceramic, a nitride, a polymer, a metal, or an alloy.

15. The method of claim 12, wherein the reinforcement material comprises a continuous ceramic fiber, the method further comprising coating the continuous ceramic fiber with a matrix material or a matrix material precursor prior to or while extruding the continuous ceramic fiber from an additive manufacturing device.

16. The method of claim 12, further comprising introducing a matrix material or a matrix material precursor after depositing the reinforcement material and before removing the core.

17. The method of claim 12, wherein the reinforcement material comprises a continuous ceramic fiber, and wherein a minimum curvature of a surface of the feature comprises the minimum bend radius of the continuous ceramic fiber.

18. The method of claim 12, wherein the coating comprises a first layer on the core and a second layer on the first layer, and wherein the second layer comprises silicon.

19. The method of claim 18, wherein the coating comprises at least one of a rare earth silicate, a zirconia-based thermal barrier coating, or a hafnia-based thermal barrier coating.

* * * * *